(12) United States Patent
Wakabayashi et al.

(10) Patent No.: US 7,921,749 B2
(45) Date of Patent: Apr. 12, 2011

(54) CASE

(75) Inventors: Koji Wakabayashi, Nishio (JP);
Daisuke Saito, Okazaki (JP); Yoshiyuki Aoyama, Nishio (JP); Satoshi Munakata, Nishikamo-gun (JP)

(73) Assignees: Aisin AI Co., Ltd., Nishio-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 880 days.

(21) Appl. No.: 11/882,574

(22) Filed: Aug. 2, 2007

(65) Prior Publication Data

US 2008/0053270 A1   Mar. 6, 2008

(30) Foreign Application Priority Data

Aug. 31, 2006  (JP) .................................. 2006-236993

(51) Int. Cl.
*F16H 57/02* (2006.01)
*F16H 57/04* (2010.01)
*F16H 61/00* (2006.01)

(52) U.S. Cl. .................................................. 74/606 R

(58) Field of Classification Search ................ 74/606 R; 475/146, 116; 137/625.65; 267/170; *F16H 3/44, F16H 5/12*
See application file for complete search history.

(56) References Cited

U.S. PATENT DOCUMENTS

| 4,875,665 | A  | * | 10/1989 | Kato et al. ................. 267/170 |
| 5,799,697 | A  | * | 9/1998 | Sakaguchi et al. ....... 137/625.65 |
| 7,559,867 | B2 | * | 7/2009 | Seki et al. ................. 475/146 |
| 2007/0149337 | A1 | * | 6/2007 | Okada et al. ............... 475/116 |

FOREIGN PATENT DOCUMENTS

| JP | 61-41053  | * | 2/1986 |
| JP | 4-175541  | * | 6/1992 |

\* cited by examiner

*Primary Examiner* — Vinh T. Luong
(74) *Attorney, Agent, or Firm* — Buchanan Ingersoll & Rooney PC

(57) ABSTRACT

A case includes an assembling hole portion and a snap ring preassembled hereto. When fixing a bearing to the case, a first distance between both ends of the snap ring can be expanded within the assembling hole portion. The bearing is used for supporting a rotational shaft of the case. The assembling hole portion includes dual hole portions, which open at respective positions where the both ends of the snap ring can be expanded within the dual hole portions.

5 Claims, 3 Drawing Sheets

US 7,921,749 B2

CASE

This application is based on and claims priority under 35 U.S.C. §119 to Japanese Patent Application 2006-236993, filed on Aug. 31, 2006, the entire content of which is incorporated herein by reference.

FIELD OF THE INVENTION

This invention relates to a case having an assembling hole portion and a snap ring preassembled thereto.

BACKGROUND

With reference to FIG. 3, a known transmission case is disclosed, which includes an assembling hole portion H and a snap ring S preassembled hereto. When fixing a bearing (not shown) to the case C, a first distance between both ends E of the snap ring S can be expanded within the assembling hole H. The bearing is used for supporting a rotational shaft K. The assembling hole portion H comprises a single large-aperture hole portion.

Because the single hole portion which is comprising the assembling hole portion H that is provided to the case, the assembling hole portion requires a widely-opened aperture at a position where the both ends E of the snap ring S are located, in order to expand the both ends E of the snap ring S. Because interference of the both ends when they are being expanded needs to be prevented, the diameter of the assembling hole portion is needed to be large.

In order to have a large-aperture assembling hole portion H, a large space needs to be secured. However, having a large assembling hole portion causes degradation in case rigidity so that the case needs to be reinforced.

More specifically, when fixing the bearing to the case C, a tool to expand the snap ring S is essential. Because a single assembling hole portion H is constructed to the case C, the aperture of the assembling hole portion becomes large. Problems thus exist for a large-aperture hole portion, that are, the case C needs to be reinforced due to degradation in rigidity and large space is needed for the large-aperture hole portion.

Considering the above conventional problems, the inventors of the application have focused on dividing the assembling hole portion into two for fixing the bearing to the case.

Further, according to the aforementioned idea, the dual hole portions are located where the both ends of the snap ring are located, so that the both ends of the snap ring can be expanded within the dual hole portions. The case includes an assembling hole portion and a snap ring preassembled hereto. When fixing a bearing to the case, a first distance between both ends of the snap ring can be expanded within the assembling hole portion. The bearing is used for supporting a rotational shaft. Consequently, saving space and maintaining the case rigidity can be achieved.

SUMMARY OF THE INVENTION

According to an aspect of the present invention, a case includes an assembling hole portion and a snap ring preassembled hereto. When fixing a bearing to the case, a first distance between both ends of the snap ring can be expanded within the assembling hole portion. The bearing is used for supporting a rotational shaft of the case. The assembling hole portion includes dual hole portions, which open at respective positions where the both ends of the snap ring can be expanded within the dual hole portions.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be explained with reference to the engaged drawings.

Figure 1:
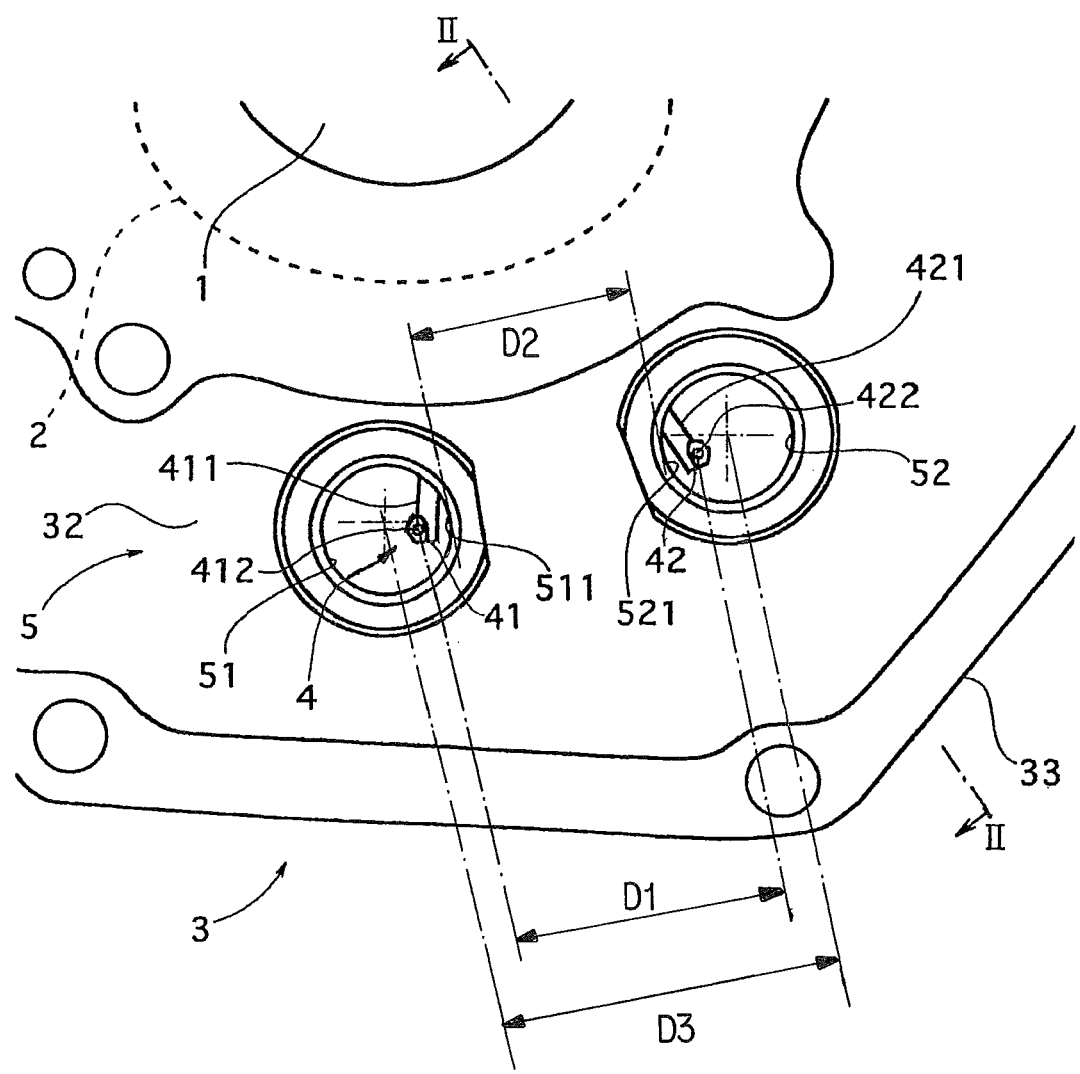
FIG. 1 is a partial side view for explaining substantial part of the transmission case according to an embodiment of the present invention.
Figure 2:
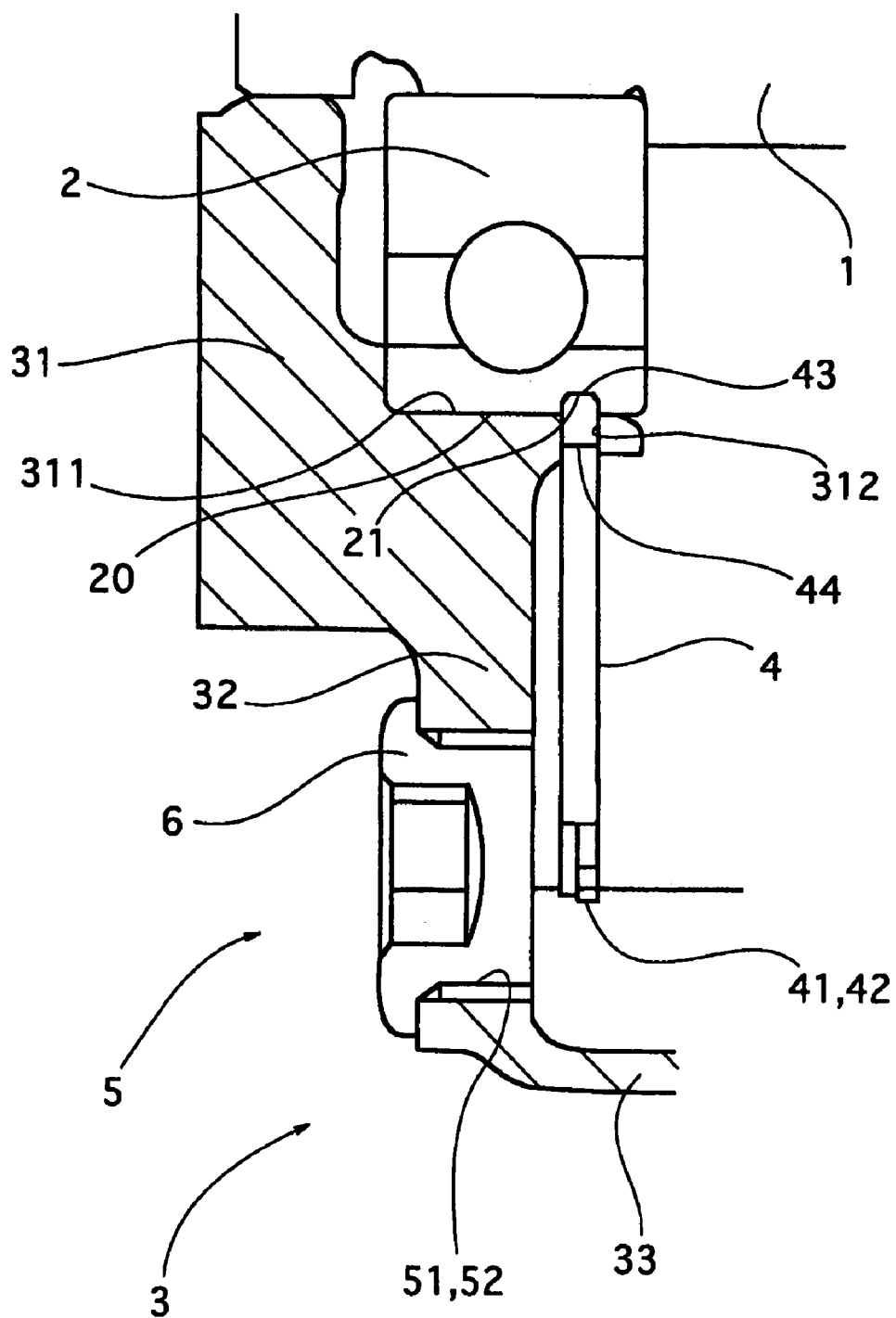
FIG. 2 is a partial sectional view taken along line II-II of FIG. 1 for explaining substantial part of the transmission case according to the embodiment of the present invention.

With reference to FIGS. 1 and 2, a transmission case 3 includes an assembling hole portion 5 and a snap ring 4 preassembled hereto. When fixing a bearing 2 to the case 3, a first distance D1 both ends of the snap ring 4 can be expanded within an assembling hole portion by means of the tool. The bearing 2 is used for supporting a rotational shaft 1. The assembling hole portion 5 includes dual hole portions 51 and 52, which open at respective positions where the both ends 41 and 42 of the snap ring 4 can be expanded within the dual hole portions.

With reference to FIGS. 1 and 2, the rotational shaft 1 is provided with a plurality of gears (not shown) of the transmission for transmitting torque from an engine (not shown) and the bearing 2 rotatably supports the rotational shaft 1 to the case 3. An outer peripheral portion of the bearing 2 is engaged with an inner wall surface of a groove portion 311 provided in a shaft end portion 31 of the case 3. The bearing 2 is then fixed to the case by the snap ring 4.

The assembling hole portion 5 is provided in the transmission case 3. The case has a vertical portion 32 and a horizontal portion 33 connected to the vertical portion 32 as shown in FIG. 1. The snap ring 4 is preassembled to the vertical portion 32 of the case 3. When fixing the bearing 2 to the case 3, a first distance between both ends of the snap ring 4 can be expanded within the assembling hole portion 5.

The size of the dual hole portions 51 and 52, i.e., the diameter of the hole portions 51 and 52 are determined considering the expanding of both ends of the snap ring 4 and an insertion of the tool for expanding. The dual hole portions 51 and 52 are opened at the vertical portion 32 of the case 3 respectively located at both ends of the snap ring 4, which has been preassembled to the case.

The second distance D2 between the dual hole portions 51 and 52 is determined to be shorter than the first distance between the both ends 41 and 42 of the snap ring 4. The snap ring 4 is constructed so that the both ends 41 and 42 can be located within the dual hole portions 51 and 52.

The first distance M between the both ends 41 and 42 of the snap ring is determined to be shorter than a third distance D3 between each center point of the dual hole portions 51 and 52. Further, the both ends 41 and 42 of the snap ring are positioned within range of the dual holes portions 51 and 52 while the second distance D2 between the dual hole portions 51 and 52 is determined to be shorter than the first distance M between the both ends 41 and 42 of the snap ring 4. Therefore, the both ends 41 and 42 of the snap ring 4 can be expanded by means of the tool.

The snap ring 4 includes a snap ring with small holes having bending portion 411 and 421 that are formed widen toward the ends thereof. The each end of the bending portions 411 and 421 are bent from each end 41 and 42 outwardly in a radial direction to form an Ω shape. Each end of the bending portions 411 and 421 is provided with a small hole in which a tool is inserted for expanding the snap ring with small holes.

With reference to FIG. 2, an inner peripheral wall portion 43 of the snap ring with small holes 4 is engaged with an annular groove portion 21 formed at an outer peripheral portion 20 of the bearing 2 and an outer peripheral wall portion 44 is engaged with an annular groove portion 312 of the groove portion 311 provided at the shaft end portion 31 of the case 3 to engage the bearing 2 to the case 3.

The dual hole portions 51 and 52 are provided with an inner screwed groove portion at the inner peripheral portion and after the bearing 2 is engaged with the shaft end portion 31 of the transmission case 3 and fixed thereto by the snap ring 4, a nut 6 is screwed into a corresponding dual hole portion 51 and 52 to be engaged with the inner screwed groove portions of the hole portions for closing the hole portions. The nuts 6 have hexagonal recessed portions at each center. The snap ring 4 are expanded by means of the tool in order to replace the bearing 2, after disengaging the hexagonal-recessed head nuts 6.

With the configuration of the transmission case according to the embodiment of the present invention, the assembling hole portion 5 comprising the dual hole portions 51 and 52 open at the respective positions where the both ends 41 and 42 of the snap ring with small holes 4 are located. The snap ring with small holes is preassembled to the transmission case in order to fix the bearing 2 to the transmission case 3. The bearing 2 rotatably supports the rotational shaft 1 to the case 3. Through the dual hole portions 51 and 52, the tool can be inserted to an inside of the transmission case 3.

The both ends 41 and 42 of the snap ring with small holes 4 include the bending portion 411 and 421. Each end of the bending portions 411 and 421 is provided with the small hole 412 and 422. The first distance between the both ends 41 and 42 of the snap ring with small holes 4 can be expanded by mean of a tool engaged with the small holes 412 and 422. The distance of the both ends 41 and 42 is expanded in order to engage the outer peripheral portion 20 of the bearing 2 with the inner wall surface of the groove portion 311 provided at the shaft end portion 31 of the case 3. The outer peripheral portion 20 of the bearing 2 is then fixed to the transmission case 3 by the snap ring with small holes 4.

With reference to FIG. 2, the inner peripheral wall portion 43 of the snap ring with small holes 4 is engaged with the annular groove portion 21, which is formed on the outer peripheral portion 20 of the bearing 2. The outer peripheral portion 44 of the snap ring with small holes 4 is engaged to the annular groove portion 312 of the groove portion 311 provided at the shaft end portion 31 of the transmission case 3 to engage the bearing 2 to the case 3.

After engaging the bearing 2 to the case 3 by the snap ring 4, the hexagon-recessed head 6 are screwed into the dual hole portions 51 and 52 to be engaged with the inner screwed groove portions of the hole portions for closing the hole portions. The nuts 6 have hexagonal recessed portions at each center. The snap ring 4 are expanded by means of the tool in order to replace the bearing 2, after disengaging the hexagonal-recessed head nuts 6.

According to the embodiment of the present invention, the transmission case includes the assembling hole portion 5 and the snap ring with small holes 4 preassembled hereto. The snap ring with small holes 4 is preassembled to the transmission case in order to fix the bearing to the transmission case. The bearing rotatably supports the rotational shaft to the transmission case. Because the assembling hole portion 5 comprising the dual hole portions 51 and 52 open at the respective positions where the both ends 41 and 42 of the snap ring with small holes 4 are located, the tool can be inserted to an inside of the transmission case through the dual hole portions 51 and 52 in order to fix or replace the bearing 2.

According to the embodiment of the present invention, with reference to FIG. 2, because the assembling hole portion is divided into two for fixing the bearing to the case, the diameter of the assembling hole portion 5 can be downsized. Therefore, saving space while improving rigidity of the transmission case can be achieved.

Figure 3:
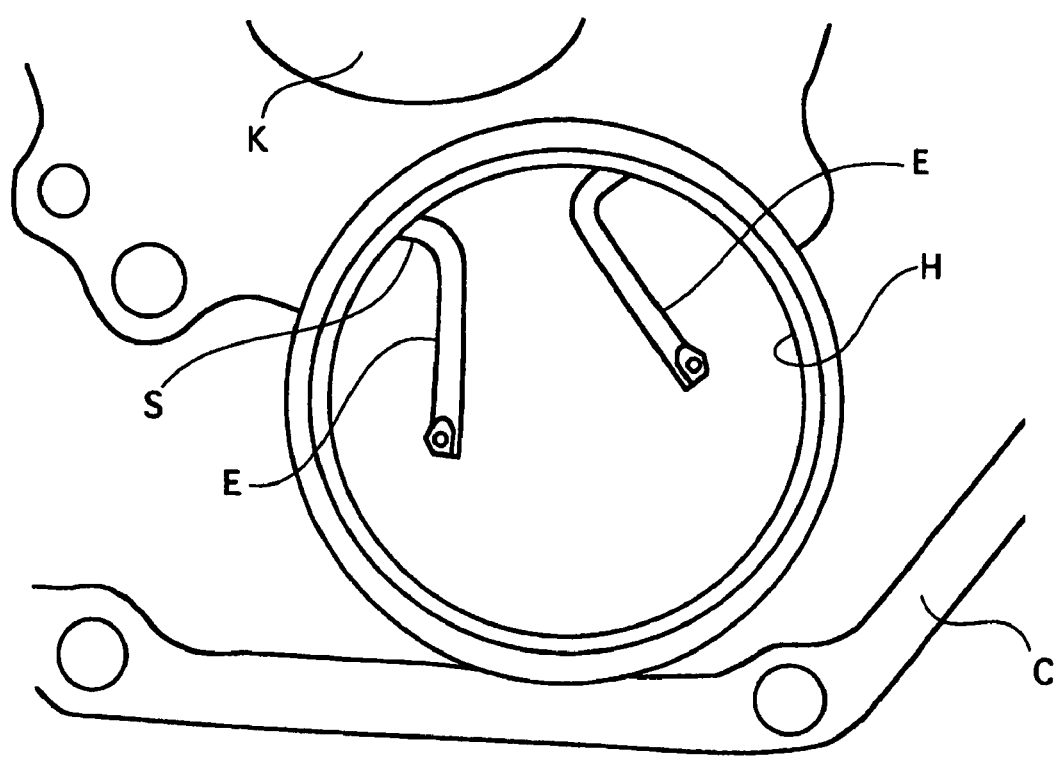
FIG. 3 is a partial side view for explaining substantial part of a known art transmission case.

According to the embodiment of the present invention, with reference to FIGS. 1 and 3, the diameter of the assembling hole portion for the known transmission case can be downsized by approximately four times. By eliminating excess space for the known assembling hole portion, the hexagonal-recessed head nut 6 blocking the corresponding assembling hole portions 51 and 52 can be replaced with or made to a smaller nut. Therefore, maintaining rigidity of the transmission case can be achieved.

According to the embodiment of the present invention, because of the downsized diameter of the assembling hole portion 5 of the transmission case, man-hour required for production process can be reduced. Further, the significantly downsized nuts 6 blocking the corresponding assembling hole portions can contribute to improve cost efficiency.

According to the embodiment of the present invention, the second distance between the dual hole portions 51 and 52 of the transmission case is determined to be shorter than the first distance between the both ends 41 and 42 of the snap ring with small holes 4 so that the both ends 41 and 42 can be located within the dual hole portions 51 and 52. Because the both ends 41 and 42 are located within the range of the dual hole portions 51 and 52, the both ends 41 and 42 of the snap ring with small holes 4 can be expanded by means of the tool.

According to the embodiment of the present invention, with reference to FIG. 1, the first distance between the both ends 41 and 42 of the snap ring with small holes 4 is determined to be shorter than the third distance between each center point of the dual hole portions 51 and 52 while the second distance between the dual hole portions 51 and 52 is determined to be shorter than the first distance between the both ends 41 and 42 of the snap ring 4. Because the first distance between the both ends 41 and 42 of the snap ring with small holes 4 is shorter than the third distance between each center point of the dual hole portions 51 and 52, a motion space for the both ends 41 and 42 of the snap ring with small holes 4 is extended. Consequently, fixing of the bearing 2 to the transmission case 3 can be easier.

According to the embodiment of the present invention, the case includes the transmission case. Because the diameter of the assembly hole portion can be reduced by dividing the assembling hole portion of the transmission case into two, saving space while improving rigidity of the transmission case can be achieved.

According to the embodiment of the present invention, a pair of the hexagonal-recessed head nut 6 are engaged for blocking the corresponding dual hole portions 51 and 52, after fixing the bearing 2 of the transmission case 3. Because the dual hole portions 51 and 52 are blocked, penetration of foreign objects to inside or outside of the transmission case 3, and discharge or leakage of contents including oil of the transmission case can be prevented.

According to an aspect of the present invention, a case includes an assembling hole portion and a snap ring preassembled hereto. When fixing a bearing to the case, a first distance between both ends of the snap ring can be expanded within the assembling hole portion. The bearing is used for supporting a rotational shaft of the case. The assembling hole portion includes dual hole portions, which open at respective positions where the both ends of the snap ring can be expanded within the dual hole portions by means of a tool.

With the configuration of the case according to the embodiment of the present invention, the case includes an assembling hole portion and a snap ring preassembled hereto. When fixing a bearing to the case, the first distance between both ends of the snap ring can be expanded within the assembling hole portion. The bearing is used for supporting a rotational shaft. Because the dual hole portions, which open at respective positions where the both ends of the snap ring are located, the both ends of the snap ring can be expanded within the dual hole portions. Because of the expansion of the both ends of the snap ring is enabled while being able to reduce the diameter of the hole portion by dividing the assembling hole portion of the transmission case into two, saving space and improving rigidity of the case can be achieved.

According to the embodiment of the present invention and according to claim 2, the second distance between the dual hole portions is determined to be shorter than the first distance between the both ends of the snap ring.

With the configuration of the case according to the embodiment of the present invention, the second distance between the dual hole portions is shorter than the first distance between the both ends of the snap ring. Therefore the both ends of the snap ring can be located within the range of the dual hole portions. Consequently, the distance of the both sides of the snap ring can be expanded when fixing the bearing to the case.

According to the embodiment of the present invention and according to claim 3, the first distance between the both ends of the snap ring is determined to be shorter than the third distance between each center point of the dual hole portions while second distance between the dual hole portions is determined to be shorter than the first distance between the both ends of the snap ring. The both ends of the snap ring are positioned within range of the dual holes portions.

With the configuration of the case according to the embodiment of the present invention, the first distance between the both ends of the snap ring is determined to be shorter than the third distance between each center point of the dual hole portions while the both ends of the snap ring are positioned within range of the dual holes portions. Because an extended motion space for the both ends 41 and 42 of the snap ring with small holes, fixing of the bearing to the transmission case can be easier.

According to the embodiment of the present invention, the case according to claim 4 includes a transmission case.

With the configuration of the case according to the embodiment of the present invention, the case includes the transmission case. Because the diameter of the assembly hole portion can be reduced by dividing the assembling hole portion of the transmission case into two, saving space while improving rigidity of the transmission case can be achieved.

According to the embodiment of the present invention, the case according to claim 5, a pair of the hexagonal-recessed head nut 6 are engaged for blocking the corresponding dual hole portions 51 and 52, after fixing the bearing 2 to the transmission case 3.

With the configuration of the case according to the embodiment of the present invention, a pair of the hexagonal-recessed head nut 6 are engaged for blocking the corresponding dual hole portions 51 and 52, after fixing the bearing 2 to the transmission case 3. Therefore, penetration of foreign objects to inside or outside of the transmission case, and discharge or leakage of contents including oil of the transmission case can be prevented.

Although the aforementioned embodiment of the present invention describes a snap ring 4 includes a snap ring with small holes having bending portion 411 and 421 which are formed widen toward the ends thereof, the each end of the bending portions 411 and 421 are bent from each end 41 and 42 outwardly in a radial direction to form an Ω shape, the each end of the bending portions 411 and 421 is provided with a small hole in which a tool is inserted for expanding the snap ring with small holes, variation of the snap ring is not limited to the illustrated snap ring. Appropriate design of the snap ring can be applied, such as a snap ring having shorter bent part 411 and 421 barely allowing to the snap ring to have the small holes of 412 and 422 or a snap ring having a projection to latch the tool together instead of having the small holes 412 and 422, or the like. Further, appropriate application of the snap ring can be applied to the present invention, such as a shaft snap ring that is used for fixing a shaft and a hole snap ring that is used for fixing a bearing, or the like.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A case, comprising:
a bearing for supporting a rotational shaft;
an assembling hole portion including a dual hole portions; and
a snap ring preassembled to the case, the snap ring possessing opposite ends, one of the ends of the snap ring being positioned in one of the hole portions, the other end of the snap ring being positioned in the other hole portion; wherein
a first distance between the ends of the snap ring is configured to expand within a range of the dual hole portions, which open at respective positions where the ends of the snap ring are expandable within the dual hole portions when fixing the bearing to the case.

2. The case according to claim 1, wherein a second distance between the dual hole portions is shorter than the first distance between the ends of the snap ring.

3. The case according to claim 2, wherein the first distance between the ends of the snap ring is shorter than a third distance between each center point of the dual hole portions, the ends of the snap ring being positioned within the range of the dual holes portions while the second distance between the dual hole portions is shorter than the first distance between the ends of the snap ring.

4. The case according to claim 1, wherein the case includes a transmission case.

5. The case according to claim 1, wherein a pair of nuts are engaged with the corresponding dual holes for blocking the dual hole portions, after fixing the bearing to the case.

* * * * *